D. B. BARNUM.
Carriage-Spring.
No. 1,369.
Patented Oct. 16, 1839.
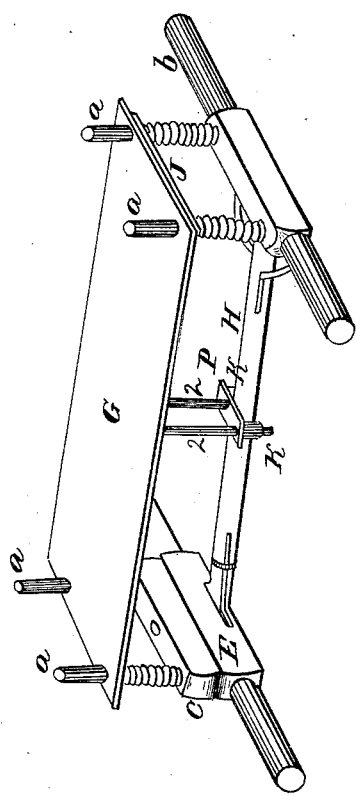

UNITED STATES PATENT OFFICE.

DIMON B. BARNUM, OF NEW FAIRFIELD, CONNECTICUT.

METHOD OF HANGING CARRIAGE-BODIES.

Specification of Letters Patent No. 1,369, dated October 16, 1839.

*To all whom it may concern:*

Be it known that I, DIMON B. BARNUM, of New Fairfield, in the county of Fairfield and State of Connecticut, have invented a new and Improved Mode of Hanging Carriage-Bodies; and I do hereby declare that the following is a full and exact description thereof, reference being had to the annexed drawings of the same, making part of this specification.

The nature of this invention consists in providing the hindmost axletree and front bolster with any number of rods or standards of suitable length and diameter, made fast to the said axletree and bolster and standing perpendicular; and also in providing the under side of the bottom of the carriage body with one or more rods; this rod (or rods) is to be made fast to the body underneath and extending directly down to the reach or perch and upon the reach or perch is to be bolted a plate of metal with a hole or mouth to receive the rod (or rods) sufficiently large that the rod may slide up and down. Around each of the first mentioned rods are to be placed spiral springs upon the top of which the body rests by means of appendages for that purpose.

To enable others skilled in the art to make and use my invention I will proceed to describe its construction and operation.

I construct my carriage bodies, wheels, &c., in any of the known forms. I apply any number of rods or standards a to the hindmost axletree b (see annexed drawing) and front bolster c; this bolster being over the front axletree E; these rods are to be made firm in the axletree and bolster, standing perpendicular, or nearly so; these rods or standards may be made of round iron of suitable length and size with screws cut upon each end, one end to pass through the axletree and fasten with a nut upon the screws; the other is to pass through a bar or brace at the top to keep it steady. Around any number of these rods are to be placed spiral springs fitted to the size of the rods which may be taken off or added at pleasure, as more or less strength is required. I then make fast to the under side of the bottom of the body of the carriage one or more rods 2, 2, and let them pass down to the reach H and enter a hole or mouth in a plate P of metal calculated to receive them, around which on the under side of the plate is formed a tube or socket K; this rod 2 with the plate P and socket K, is to keep the body from swaying to the right or left and may also be applied to carriages with elliptic springs and will be found to answer a good purpose. These rods may also be accompanied with a spiral spring as before described. For carriages of heavy burthen it may be found necessary to fit a sill of wood upon each side of the gear work, one end of each resting upon the hind axletree near the hub and the other end of each upon the ends of the bolster; then into these sills let the rods or standards be fastened with the springs around them as before described.

Should greater weight be required than single springs are capable of carrying the strength may be multiplied by fitting other springs around those already upon the rod by coiling alternately one spring to the right and the other to the left; they will be found to act equally as well as when single.

What I claim as my invention and which I desire to secure by Letters Patent consists in—

The combination and arrangement of the rods 2, 2, plate P and sockets K K with the carriage as before described for preventing the swaying of the carriage body.

DIMON B. BARNUM.

Witnesses:
C. BISHOP,
EDMD. MAHER.